Jan. 29, 1952
F. J. PILIA
2,583,665
GAS BLANKETED ARC WELDING
Filed July 9, 1949
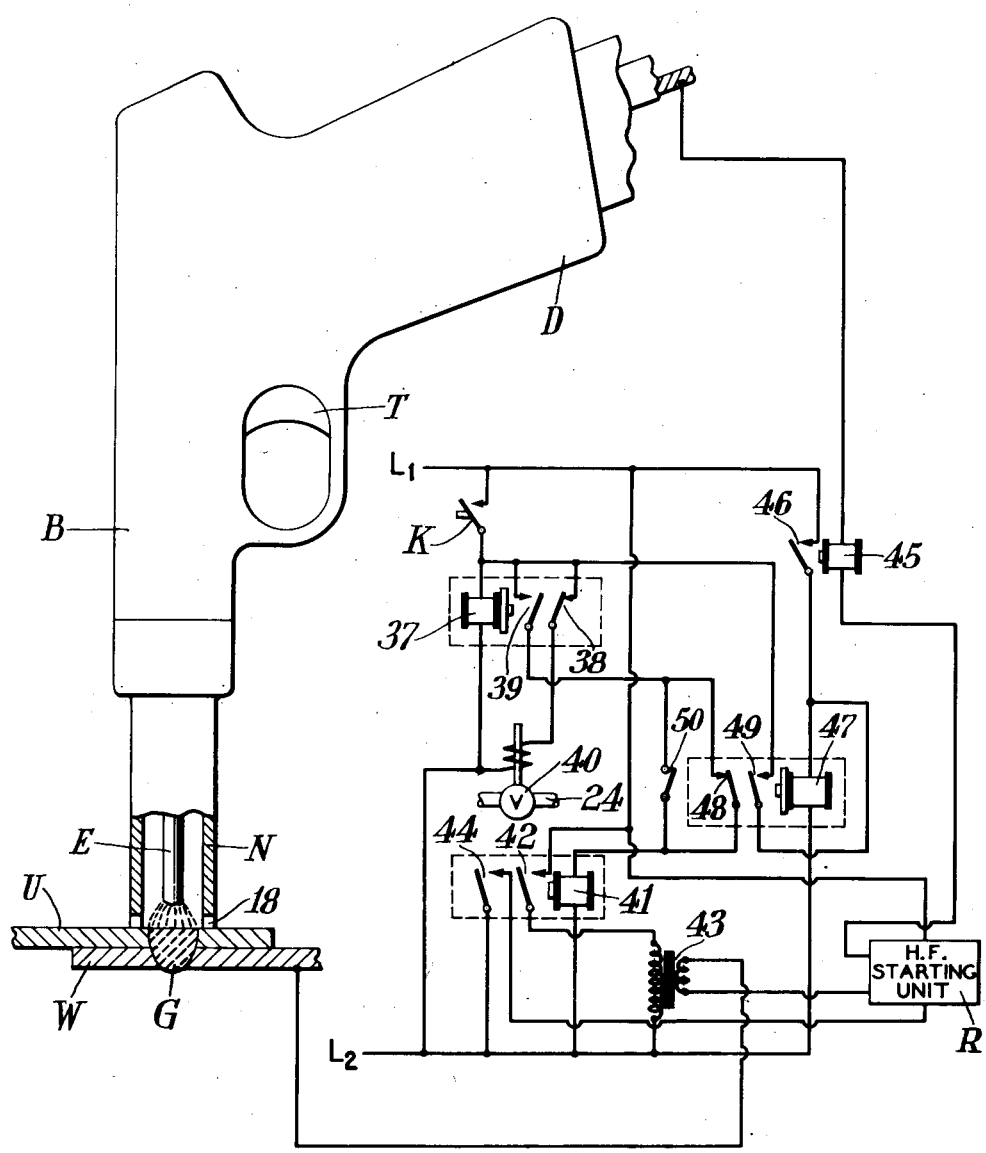
INVENTOR
FRANK J. PILIA
BY
D. C. Harrison
ATTORNEY Patented Jan. 29, 1952

2,583,665

UNITED STATES PATENT OFFICE 2,583,665

GAS BLANKETED ARC WELDING

Frank J. Pilia, West Orange, N. J., assignor, by mesne assignments, to Union Carbide and Carbon Corporation, a corporation of New York Application July 9, 1949, Serial No. 103,860

5 Claims. (Cl. 219—10)

This invention relates to gas blanketed arc fusion spot welding, and more particularly to a method of this character for making localized welds, such as a group of spaced apart welds uniting two metal parts in superimposed or face-to-face relation.

This application is in part a continuation of my copending application Serial No. 731,577, filed February 28, 1947, now Patent Number 2,550,495 of April 24, 1951.

In gas blanketed arc welding as practiced according to the procedure disclosed in Meredith Patent No. 2,342,086, for example, a non-consumable electrode is kept in continuous motion along a welding line, to produce a continuous seam or butt weld uniting two metal plates or sheets. In such seam welding the end of the nozzle which supplies inert gas to blanket the welding zone and the electrode must be constantly spaced from the work for clearance as the nozzle and electrode are moved along the welding line. Also, inasmuch as continuity of the welded seam is essential, no provision is made for repetitive starting and stopping of the gas flow and the welding current.

In many fabricating operations it is desirable to permanently and economically unite metal members, such as sheets of aluminum, stainless steel, and the like, in face-to-face or overlapping relation by localized or spot welds, as distinguished from uniting edges of such members by butt welds or by continuous welded seams.

Conventional spot welding as heretofore practiced has been a resistance welding operation, in which the work to be welded must be brought to a stationary machine and inserted between two electrodes. The temperature of the metal to be welded is raised by the resistance thereof to heat it to a plastic state, and then pressure must be applied to effect the weld. The temperature does not exceed the melting temperature of the metal, and a solid phase weld is produced. The stationary machine, the portable work, the length of the current carrying arms, and the depth of the throat between the electrodes have been limitations on this process.

Spot welding by the arc welding process has not been commercially satisfactorily produced heretofore, because the heat sources heretofore employed have not been sufficiently concentrated or controlled to produce a spot and have the heat penetrate to the lower sheet and raise it to a welding temperature without burning or completely melting away the top sheet in one spot. For these reasons there has been no commercially satisfactory fusion spot welding, in which the weld nugget becomes completely molten, in the liquid state, and solidifies from this liquid state to produce the fusion weld.

The principal object of this invention is to provide a gas blanketed arc fusion spot welding method, and for utilizing a non-consumable electrode and a blanketing inert gas stream to expeditiously and economically produce localized or spot welds uniting superimposed or overlapping members, particularly sheets of stainless steel, magnesium, aluminum, and the like. Other important objects are to provide a spot welding method wherein an inert gas is economically utilized to blanket both the welding zone and the adjoining non-consumable electrode while maintaining the latter in a stationary position at each welding point for the duration of the welding arc; wherein the nozzle for confining the discharging inert gas stream is utilized to engage and apply pressure against the work and to assist in positioning the electrode relatively to the welding point; and wherein the gas flow and the welding current are concurrently controlled so that they may be turned on and off repeatedly and rapidly at spaced welding points, in timed relation and automatically or in response to necessary manipulation of the apparatus, to quickly produce a succession of uniformly strong spot welds between superimposed metal sheets.

The single figure of the drawing is a diagram of apparatus for carrying out the method according to the present invention.

According to the present invention, gas blanketed arc fusion spot welding of a metal sheet to a metal surface is accomplished by advancing a gas confining nozzle to bring its rim into contact with said sheet to surround a spot thereon spaced inwardly from the edges thereof, simultaneously directing a non-depositing electrode inside of and coaxial with said nozzle toward the center of said spot, positioning said electrode with its tip spaced from said sheet and spaced back from said nozzle rim, exerting pressure on said nozzle to cause a ring of pressure contact between said sheet and said surface and surrounding said spot, maintaining a zone of non-oxidizing gas inside said nozzle surrounding said electrode, maintaining a layer of said non-oxidizing gas above said nozzle rim and below said electrode up and extending over said spot, striking an arc between said electrode tip and said spot and through said layer of non-oxidizing gas, maintaining said arc until said spot is heated to fusion temperature and the heat is conducted therethrough to bring the registering portion of said metal surface within said ring of pressure contact to fusion temperature and the molten portions of said sheet and metal surface coalesce, and maintaining said ring of pressure contact and said electrode stationary for the duration of the arc. In this process only a single electrode is employed, which is preferably a substantially non-consumable electrode constructed of refractory metal such as tungsten or molybdenum, no filler metal is employed, no flux is required, and the spot weld is formed solely by the fusion and coalescence of the metal of the juxtaposed parts being welded. The gas is preferably inert, for example, consisting essentially of a noble monatomic gas such as argon or helium or mixtures thereof or with other gases.

When superimposed sheets of metal are welded, the gas shielded arc is struck between the electrode and a localized area of at least the nearer of the superimposed sheets through a circular layer of gas over said localized area, the welding heat is conducted into the opposed localized area of the underlying sheet, the arc and gas flow are discontinued after the opposed molten portions fuse together, the electrode and its associated gas-confining nozzle are moved to another localized area laterally spaced from the first, and the operation is repeated to form another weld at the second localized area. Preferably the gas flows along the electrode and discharges through a non-current-carrying nozzle surrounding the electrode, the front end of the nozzle lies in a plane perpendicular to the axes of the electrode, thereby adapting the front end of the nozzle to be pressed into contact with the surface of a flat sheet at numerous points or all points surrounding the localized area, the electrode is spaced from the metal surface and held in a stable position perpendicular to the surface, and the arc is struck through the circular layer of gas between the tip of the electrode and the metal. The flow of gas and the welding current are turned on and off in timed relation.

In the drawing, upper and lower sheets of metal U and W are shown in superimposed relation with opposed surface portions thereof contacting one another. The arc is struck between the upper sheet U and the tip of an electrode E. A nozzle N directs the stream of inert gas along the electrode E and over the arc and the welding zone.

The electrode E and the nozzle N are carried by a torch or gun which comprises a barrel B provided with a handle D shaped as a pistol grip to facilitate aiming or other manipulation. The barrel B is constructed to conduct electric welding current to the electrode E, and to supply gas to the nozzle N.

A trigger T is mounted adjacent the junction of the handle D and the barrel B and actuates a switch K which energizes mechanism shown diagrammatically for turning on the flow of inert gas and welding current successively in timed relation.

After the gun has been positioned so that the rim of the nozzle N bears against the top or near sheet of metal U, pressure is exerted on the handle D to force the nozzle N downwardly under considerable pressure. This pressure serves to steady the gun and hold the nozzle in position, and to cause a ring of pressure contact between the sheets U and W, under the rim of the nozzle. The electrode E is centered in the nozzle N, with its tip spaced from the upper sheet U, and spaced back from the nozzle rim.

The trigger T is now pulled to actuate the switch K and turn on the flow of inert gas and welding current successively in timed relation.

The flow of inert gas fills the annular zone within the nozzle N surrounding the electrode E, and also forms a layer of inert gas above the nozzle rim below the electrode tip and extending over the upper surface of the sheet U within the nozzle rim. Preferably the nozzle rim has vent openings or notches 18 to slowly vent the blanketing gas for purging the interior of the nozzle in starting to prevent the gas pressure from building up within the nozzle and blowing the fluid metal of the weld through the two sheets being welded.

After the flow of inert gas has purged the nozzle and formed the gas layer, the arc is struck between the tip of electrode E and the upper sheet U, and through the layer of gas therebetween confined by the nozzle rim. The arc is maintained until the spot on the upper sheet U is heated to fusion temperature and the heat is conducted therethrough to bring the registering portion of the under sheet W within the ring of pressure contact to fusion temperature and the molten portions of the sheets U and W coalesce and form an inverted sugar loaf shaped weld nugget G. A cross section of the weld nugget is U-shaped with the loop of the U flush with the bottom surface of the lower sheet W. Penetration into the lower sheet should be just visible on the bottom side, with no appreciable drop through. The top surface of the nugget G should be of the order of from two to three times the diameter of the non-consumable electrode used, dependent upon the magnitude of the welding current.

It should be noted that the ring of pressure contact below the nozzle rim is outside the weld nugget, and thus applied at all times between solid or unfused portions of the sheets. The nozzle N, electrode E, and ring of pressure contact are maintained stationary, and the argon flow is continued, for the duration of the arc, which is extinguished after a predetermined time interval. The argon flow is continued for a predetermined time interval after the arc is extinguished, to prevent oxidation of the electrode and preferably the weld nugget, until the same have cooled to a temperature below that of rapid oxidation.

As shown in the diagram, a timer 37 is in series with the switch K for controlling the supply of argon or other inert gas, and comprises a delayed action relay having normally closed contacts 38 and normally open contacts 39. The contacts 38 are in series with the coil of a solenoid valve 40 in the argon conduit 24. The contacts 39 are in series with the coil of a welding starter relay 41 having one set of normally open contacts 42 in series with the primary coil of a welding transformer 43, and another set of normally open contacts 44 in series with a high-frequency starting unit R.

The welding circuit from the secondary coil of the welding transformer 43 includes the electrode E, the work UW, the high-frequency starting unit R, and the coil of a welding current relay 45. This relay has normally open contacts 46 in series with the coil of a weld timer 47, which comprises a delayed action relay having normally closed contacts 48 and normally open contacts 49. A cut-out switch 50 is shunted around the welding contacts 48, the two comprising a parallel circuit in series between the argon timer contacts 39 and the weld starter relay 41.

The switch K is normally open, and when closed by the trigger T, energizes the solenoid valve 40 through normally closed contacts 38 of the argon timer 37 to turn on the inert gas to the conduit 24. At the same time the switch K starts the timing period for the argon timer 37.

After a time interval sufficient for the argon flow to fill the nozzle N and blanket the weld area the argon timer 37 closes the contacts 39, which through closed contacts 48 of the weld timer 47 energizes the weld starter relay 41 to close the contacts 42 for the primary coil of the transformer 43 which induces the welding current in the secondary coil of the transformer forming a part of the welding current circuit. The welding current circuit includes the high-frequency starting unit R, which establishes the arc and permits welding current to flow through the electrode E and plates U and W. Meanwhile, argon gas continues to envelop the tip of the electrode E and to blanket the arc as well as the heated area on the plate U.

When the welding current flows, it energizes the relay 45 to close the contacts 46, which energizes the welding timer 47 which times the duration of the weld. After a time interval the relay 47 opens contacts 48 to deenergize the relay 41, which opens contacts 42 and thereby deenergizes the welding transformer 43 and interrupts the flow of the welding current.

At the same time, the welding timer 47 closes its contacts 49, keeping the timer from resetting and recycling. Argon continues to flow until the argon timer 37 opens the contacts 38 to deenergize the solenoid valve 40 which cuts off the gas flow in the conduit 24. When the operator releases the trigger T the switch K automatically opens, which deenergizes and automatically resets the argon timer 37 for the next cycle.

The switch 50 may be employed to manually cut out the welding timer 47, in which the duration of the weld is governed by the length of time the operator holds the switch K closed by pressure on the trigger T. The argon flow is automatically timed regardless of the position of the switch 50.

The gas blanketed arc method of fusion spot welding hereinbefore described, in addition to the other metals mentioned, is applicable to a limited extent to the spot welding of mild steel sheets or plates, particularly those made of fully killed or deoxygenized mild steel. Another useful application is the spot welding of light sheet to heavy plate. In spot welding thin stainless steel to heavy mild steel plate, there is no addition of filler metal and no dilution of the stainless character of the weld at the exposed surface of the stainless steel sheet, as occurs in the fusion deposition of filler metal to produce a weld. In welding liners in pressure vessels the metal arc process heretofore employed adds metal which forms a bump that must be ground off. The present invention process avoids this difficulty because it adds no metal.

Examples of optimum conditions for the present spot welding process for stainless steel, low alloy steel and mild steel are:

| Metal Thickness (inches) | Welding Current (ACHF-amp.) | Arc Time Interval (sec.) | Electrode Diameter (inches) |
| --- | --- | --- | --- |
| 0.030 | 155 | 1 | ⅛ |
| 0.035 | 170 | 1 | ⅛ |
| 0.040 | 190 | 1 | ⅛ |
| 0.050 | 205 | 1 | ⅛ |
| 0.064 | 240 | 2 | ⅛ |

I claim:

1. Gas blanketed arc method of fusion spot welding which comprises advancing a gas confining nozzle to bring its rim into contact with the metal to be welded to surround a spot thereon, simultaneously directing non-depositing electrode inside of and concentric with said nozzle toward the center of said spot, positioning said electrode with its tip spaced from the spot and spaced back from the nozzle rim, exerting pressure on said nozzle to cause a ring of pressure contact between said nozzle rim and the work and surrounding said spot to steady said nozzle and hold the work in position, maintaining a layer of non-oxidizing gas above said nozzle rim and below said electrode tip and extending over said spot, striking an arc between said electrode tip and said spot and through said layer of non-oxidizing gas, maintaining said arc until said spot is heated to fusion temperature and molten portions of the work coalesce, and maintaining said ring of pressure contact and said electrode stationary for the duration of the arc.

2. Gas blanketed arc method of fusion spot welding a metal sheet to a metal surface, which comprises advancing a gas-confining nozzle to bring its rim into contact with said sheet to surround a spot thereon spaced inwardly from the edges thereof, simultaneously directing non-depositing electrode inside of and coaxial with said nozzle toward the center of said spot, positioning said electrode with its tip spaced from said sheet and spaced back from said nozzle rim, exerting pressure on said nozzle to cause a ring of pressure contact between said sheet and said metal surface and surrounding said spot, maintaining an annular zone of non-oxidizing gas inside said nozzle surrounding said electrode, maintaining a layer of said non-oxidizing gas above said nozzle rim and below said electrode tip and extending over said spot, striking an arc between said electrode tip and said spot and through said layer of non-oxidizing gas, maintaining said arc until said spot is heated to fusion temperature and the heat is conducted therethrough to bring the registering portion of said metal surface within said ring of pressure contact to fusion temperature and the molten portions of said sheet and metal surface coalesce, and maintaining said ring of pressure contact and said electrode stationary for the duration of the arc.

3. Gas blanketed arc method of fusion spot welding superimposed sheets of metal together, which comprises directing an electrode toward a spot on the nearer of said superimposed sheets and spaced inwardly from the edges of said sheets with the end of the electrode spaced from said nearer sheet; advancing a gas confining nozzle to bring its rim into contact with said nearer sheet to surround said spot concentric with said electrode; exerting pressure on said nozzle to cause a ring of pressure contact between said sheets and surrounding said spot, turning on a supply of gas containing essentially inert noble monatomic gas to said nozzle to form a layer confined by said rim and between said electrode end and said spot, and simultaneously setting the process for automatically turning on a supply of welding current to said electrode at a predetermined time interval after said gas has been turned on, thereby striking an arc through said layer of gas between said electrode end and said spot; maintaining said nozzle rim in pressure contact with said nearer sheet and said electrode stationary for the duration of the arc, and maintaining said electrode end out of contact with the weld metal until the weld is complete.

4. Gas shielded arc method of fusion spot welding as claimed in claim 1, in which said nozzle is purged of atmospheric air before the arc is struck by passing a stream of arc-shielding gas containing noble monatomic gas through said nozzle, and in which said stream thereafter forms the layer of gas through which the arc is struck.

5. Method of uniting two sheet-like metal members by spaced apart spot welds each consisting of fused and coalesced portions of juxtaposed parts of said members, which comprises making a first weld as claimed in claim 3, then successively interrupting said arc and said shielding gas stream, and thereafter moving said electrode to the next position adjacent two other contiguous areas of such juxtaposed parts and repeating the welding operation as claimed in claim 3 to make a second weld.

FRANK J. PILIA.

REFERENCES CITED

The following references are of record in the file of this patent:

UNITED STATES PATENTS

| Number | Name | Date |
|---|---|---|
| 363,320 | De Bernardos et al. | May 17, 1887 |
| 1,344,415 | Longacre | June 22, 1920 |
| 1,967,728 | Taylor | July 24, 1934 |
| 2,219,352 | Andrus | Oct. 29, 1940 |
| 2,293,163 | Morris | Aug. 18, 1942 |
| 2,315,502 | Crecca et al. | Apr. 6, 1943 |
| 2,360,160 | Pickhaver | Oct. 10, 1944 |
| 2,367,257 | Baird | Jan. 16, 1945 |
| 2,491,479 | Dash | Dec. 20, 1949 |

FOREIGN PATENTS

| Number | Country | Date |
|---|---|---|
| 863,983 | France | Jan. 8, 1941 |